(12) United States Patent
Chang

(10) Patent No.: US 11,929,097 B2
(45) Date of Patent: Mar. 12, 2024

(54) METHOD AND APPARATUS OF EDITING MULTIMEDIA FILE, ELECTRONIC DEVICE, AND STORAGE MEDIUM

(71) Applicant: Beijing Baidu Netcom Science Technology Co., Ltd., Beijing (CN)

(72) Inventor: Yanlong Chang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 351 days.

(21) Appl. No.: 17/507,313

(22) Filed: Oct. 21, 2021

(65) Prior Publication Data

US 2022/0044703 A1    Feb. 10, 2022

(30) Foreign Application Priority Data

Oct. 23, 2020    (CN) .......................... 202011152125.8

(51) Int. Cl.
*G11B 27/02*    (2006.01)
*G10K 15/02*    (2006.01)
(Continued)

(52) U.S. Cl.
CPC .............. *G11B 27/02* (2013.01); *G10K 15/02* (2013.01); *G11B 20/00007* (2013.01);
(Continued)

(58) Field of Classification Search
CPC ... G11B 27/02; G11B 20/00007; G11B 27/19; G10K 15/02
See application file for complete search history.

(56) References Cited

U.S. PATENT DOCUMENTS 9,794,632 B1    10/2017    Matias
2001/0036356 A1    11/2001    Weaver et al.
(Continued)

FOREIGN PATENT DOCUMENTS

CN    1561635    1/2005
CN    105379254    3/2016
(Continued)

OTHER PUBLICATIONS

Chinese Office Action, issued in the corresponding Chinese Patent Application No. 202011152125.8, dated May 24, 2023, 11 pages.
(Continued)

*Primary Examiner* — Mishawn N. Hunter
(74) *Attorney, Agent, or Firm* — Hamre, Schumann, Mueller & Larson, P.C.

(57) ABSTRACT

The present disclosure provides a method and apparatus of editing a multimedia file, an electronic device, and a storage medium. The method includes: acquiring a multimedia file and an operation information contained in each editing track of a plurality of editing tracks, wherein the operation information is acquired to edit the multimedia file; detecting a multimedia file frame contained in the each editing track at a current time in a case of editing the multimedia file in a chronological order; editing the multimedia file frame contained in the each editing track at the current time by using the operation information associated with the multimedia file frame, so as to obtain an edited file frame contained in the each editing track at the current time; and performing an encoding synthesis on the edited file frame contained in the each editing track at the current time.

14 Claims, 6 Drawing Sheets

(51) Int. Cl.
*G11B 20/00* (2006.01)
*G11B 27/19* (2006.01)
(52) U.S. Cl.
CPC .... *G11B 27/19* (2013.01); *G11B 2020/00014* (2013.01); *G11B 2020/00072* (2013.01)

(56) References Cited

U.S. PATENT DOCUMENTS

| 2010/0124941 | A1* | 5/2010 | Cho | H04M 1/72427 |
| | | | | 345/173 |
| 2016/0300596 | A1 | 10/2016 | Ransdell et al. | |
| 2022/0114698 | A1* | 4/2022 | Liu | G06T 7/11 |

FOREIGN PATENT DOCUMENTS

| CN | 110166652 | 8/2019 |
| CN | 110572722 | 12/2019 |
| CN | 111246289 | 6/2020 |

OTHER PUBLICATIONS

Search and Examination Report issued in the corresponding United Kingdom Patent Application No. GB2115343.2, dated on Apr. 27, 2022, 6 pages.

* cited by examiner

METHOD AND APPARATUS OF EDITING MULTIMEDIA FILE, ELECTRONIC DEVICE, AND STORAGE MEDIUM

CROSS-REFERENCE TO RELATED APPLICATION(S)

This application claims priority to the Chinese Patent Application No. 202011152125.8, filed on Oct. 23, 2020, which is incorporated herein by reference in its entirety.

TECHNICAL FIELD

Embodiments of the present disclosure relate to a field of computer technology and cloud computing technology, specifically to a field of media cloud technology, and in particular to a method of editing a multimedia file, an apparatus of editing a multimedia file, an electronic device, and a storage medium.

BACKGROUND

With a continuous development of computer technology, usage of multimedia data is also increasing. For example, the usage of multimedia data such as audio, video or photos is increasing. Moreover, people have more requirements for a display effect of the multimedia data. For example, people want to make diverse videos or videos with clear pictures, or make nice audios, and so on.

At present, multimedia data and associated information for operation and processing may be integrated by using a related art, so as to generate a multimedia file desired by users. However, when the multimedia file is made by using the related art, an edition failure is prone to occur, an editing process may not be effectively controlled, and a processing efficiency is low.

SUMMARY

The present disclosure provides a method of editing a multimedia file, an apparatus of editing a multimedia file, an electronic device, and a storage medium.

According to a first aspect, there is provided a method of editing a multimedia file, including: acquiring a multimedia file and an operation information contained in each editing track of a plurality of editing tracks, wherein the operation information is acquired to edit the multimedia file; detecting a multimedia file frame contained in the each editing track at a current time in a case of editing the multimedia file in a chronological order; editing the multimedia file frame contained in the each editing track at the current time by using the operation information associated with the multimedia file frame, so as to obtain an edited file frame contained in the each editing track at the current time; and performing an encoding synthesis on the edited file frame contained in the each editing track at the current time.

According to a second aspect, there is provided an apparatus of editing a multimedia file, including: an acquisition module configured to acquire a multimedia file and an operation information contained in each editing track of a plurality of editing tracks, wherein the operation information is acquired to edit the multimedia file; a detection module configured to detect a multimedia file frame contained in the each editing track at a current time in a case of editing the multimedia file in a chronological order; an editing module configured to edit the multimedia file frame contained in the each editing track at the current time by using the operation information associated with the multimedia file frame, so as to obtain an edited file frame contained in the each editing track at the current time; and an encoding module configured to perform an encoding synthesis on the edited file frame contained in the each editing track at the current time.

According to a third aspect, there is provided an electronic device, including: at least one processor; and a memory communicatively connected to the at least one processor, wherein the memory stores instructions executable by the at least one processor, and the instructions, when executed by the at least one processor, cause the at least one processor to implement the method described above.

According to a fourth aspect, there is provided a non-transitory computer-readable storage medium having computer instructions stored thereon, wherein the computer instructions allow a computer to implement the method described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure.

DETAILED DESCRIPTION OF EMBODIMENTS

Figure 1:
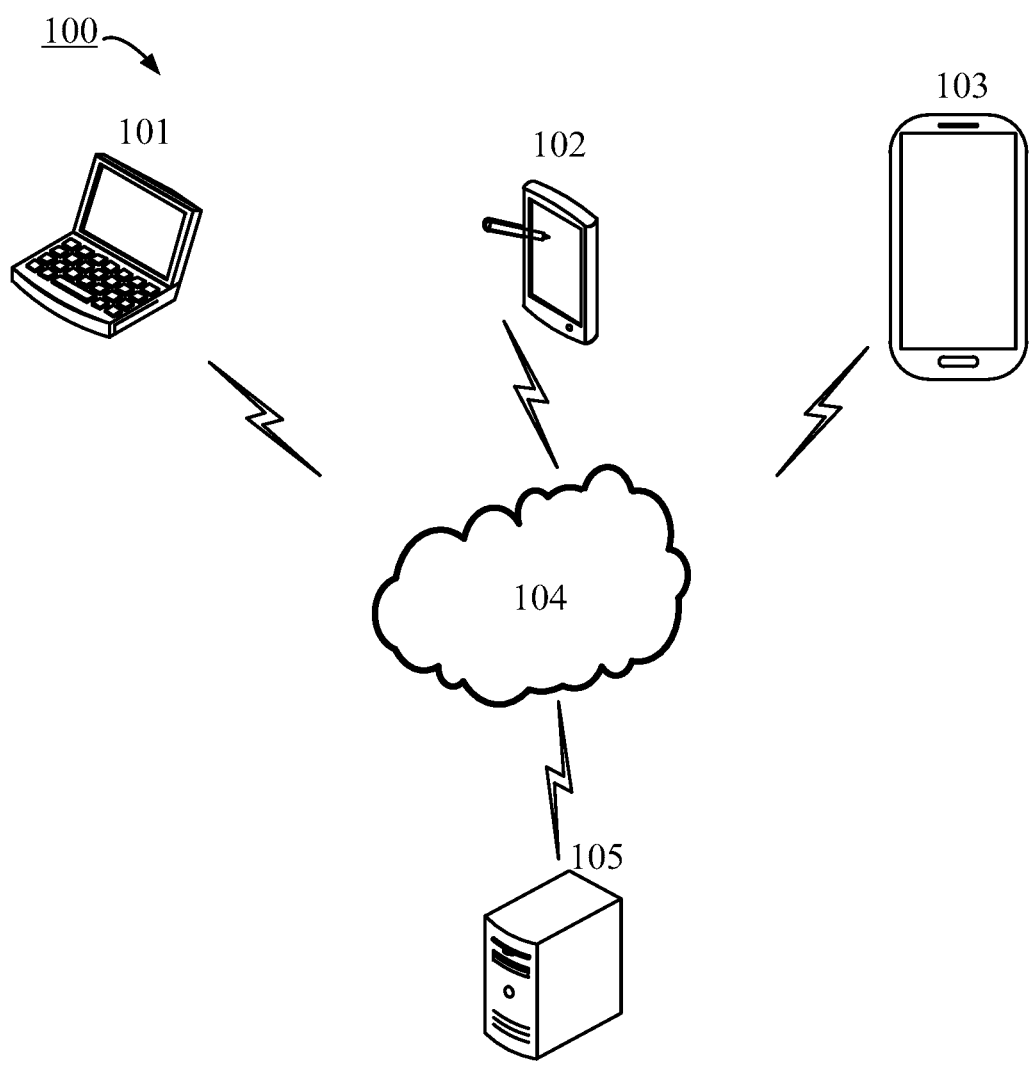
FIG. 1 schematically shows an exemplary system architecture to which a method and apparatus of editing a multimedia file may be applied according to some embodiments of the present disclosure.

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

The embodiments of the present disclosure mainly involve following technical terms.

A time axis is used to express a relationship between a signal and an object in a time domain space. It may be used to describe a sequential relationship of a subject, a behavior and a time dimension.

A time domain describes a relationship between a mathematical function or a relationship between a physical signal and time. For example, a time-domain waveform of a signal may express changes of the signal over time.

Ffmpeg (Fast forward mpeg) is a framework for audio and video transcoding, mainly used for encoding, decoding and transpackaging a multimedia file.

In a process of editing a video, if a video file, an audio file, a subtitle file and a mapping file are integrated with operation information, a video transcoding of all files is generally performed, in the related art, by generating a lengthy transcoding instruction.

In this case, if operations of editing the video, adding special effects and processing the video are numerous and complicated, a single transcoding instruction generated may be very long.

From a perspective of development, a too long transcoding instruction has a low error tolerance and contains a too large size of text, and the transcoding instruction may not be thoroughly understood. From a perspective of maintenance, if an error is contained in a single bulky transcoding instruction, existing error prompts of FFmpeg cannot accurately indicate coordinates of the error, and the transcoding instruction needs to be split to alleviate a positioning problem.

From a perspective of operation, a single bulky and redundant transcoding instruction may cause one process to continuously run the entire video editing effect for an uninterrupted period of time to perform the encoding synthesis. During this period, if the process is interrupted or other operating system level problems cause an interruption of the process, a current transcoding progress may be lost. Because the entire procedure is concentrated in one process, the specific encoding synthesis progress cannot be checked, and there is no step split. Further, because a final encoded multimedia file is continuously written during the transcoding procedure, this multimedia file is an incomplete multimedia file, so that a result of the synthesis is actually an incorrect result.

From a perspective of testing and troubleshooting, during the encoding synthesis of the video, it is necessary to produce an intermediate file to detect in which step an intermediate error is made, so as to facilitate the positioning and troubleshooting. From a perspective of iterative maintenance and software engineering, existing entire transcoding instruction is String, which is organized based on the time domain. However, FFmpeg is actually a structure organized based on a space domain. In this case, contradictions may be produced in the process of stitching the bulky transcoding instruction. As the String of the transcoding instruction becomes longer, it is more difficult to maintain the stitching process. Due to a lack of logic, it is almost impossible to maintain later iterations. This architecture has a poor error tolerance and is not suitable for complex video effect editing scenes.

FIG. 1 schematically shows an exemplary system architecture to which a method and apparatus of editing a multimedia file may be applied according to some embodiments of the present disclosure.

It should be noted that FIG. 1 is only an example of a system architecture to which the embodiments of the present disclosure may be applied, so as to help those skilled in the art to understand the technical content of the present disclosure. It does not mean that the embodiments of the present disclosure may not be applied to other apparatuses, systems, environments or scenes. For example, in another embodiment, the exemplary system architecture to which the method and apparatus of editing the multimedia file may be applied may only include terminal devices. The terminal devices may implement the method and apparatus of editing the multimedia file provided in the embodiments of the present disclosure without interacting with a server.

As shown in FIG. 1, a system architecture 100 according to the embodiments may include terminal devices 101, 102, 103, a network 104, and a server 105. The network 104 is used to provide a medium for a communication link between the terminal devices 101, 102, 103 and the server 105. The network 104 may include various connection types, such as wired or wireless communication links, and so on.

A user may use the terminal devices 101, 102, 103 to interact with the server 105 through the network 104 so as to receive or transmit a message, etc. Various client applications, such as a video editing application, an audio editing application, an email client application, and/or social platform software (as examples only) may be installed on the terminal devices 101, 102, 103.

The terminal devices 101, 102, 103 may be, for example, various electronic devices having a display screen and supporting web browsing, including but not limited to smart phones, tablet computers, laptop computers, desktop computers, and the like.

The server 105 may be a server for providing various services, such as a cloud server for providing encoding or transcoding service for content edited by the user using the terminal devices 101, 102, 103 (as examples only). The cloud server may process, such as analyze data received such as a user request, and may feed back a result of processing (for example, information or data acquired or generated according to the user request) to the terminal devices.

It should be noted that the method of editing the multimedia file provided by the embodiments of the present disclosure may generally be performed by the server 105. Accordingly, the apparatus of editing the multimedia file provided by the embodiments of the present disclosure may generally be arranged in the server 105. The method of editing the multimedia file provided by the embodiments of the present disclosure may also be performed by a server or a server cluster that is different from the server 105 and that may communicate with the terminal devices 101, 102, 103 and/or the server 105. Accordingly, the apparatus of editing the multimedia file provided by the embodiments of the present disclosure may be arranged in a server or a server cluster that is different from the server 105 and that may communicate with the terminal devices 101, 102, 103 and/or the server 105.

For example, a video file is edited by the user using the terminal devices 101, 102, 103, then operation information is transmitted to the server 105, and the server 105 processes the multimedia file according to the operation information, so that the method of editing the multimedia file provided by the embodiments of the present disclosure is performed. Alternatively, the multimedia file may be processed by the server or the server cluster that may communicate with the terminal devices 101, 102, 103 and/or the server 105, according to the operation information.

Alternatively, the method of editing the multimedia file provided by the embodiments of the present disclosure may also be performed by the terminal device 101, 102 or 103. Accordingly, the apparatus of editing the multimedia file provided by the embodiments of the present disclosure may also be arranged in the terminal device 101, 102 or 103.

It should be understood that the number of the terminal devices, the network and the server in FIG. 1 is only illustrative. The system architecture may include any number of terminal devices, networks and servers according to implementation needs.

Figure 2:
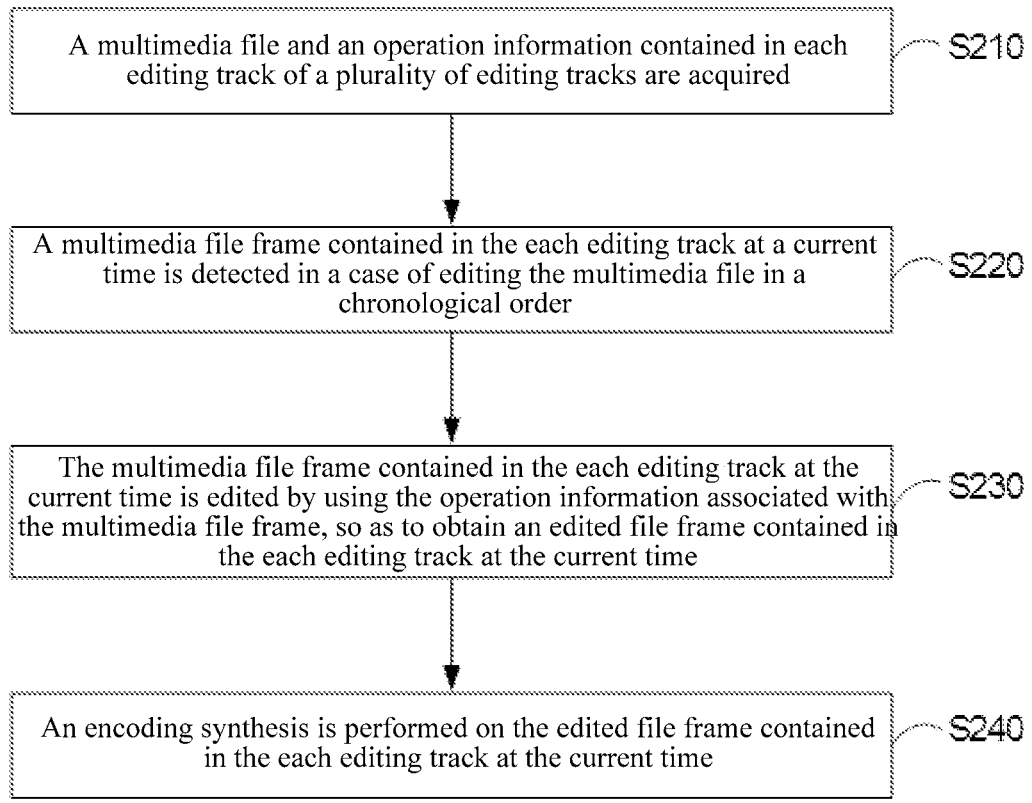
FIG. 2 schematically shows a flowchart of a method of editing a multimedia file according to some embodiments of the present disclosure.

FIG. 2 schematically shows a flowchart of a method of editing a multimedia file according to some embodiments of the present disclosure.

As shown in FIG. 2, a method 200 of editing a multimedia file includes operation S201 to operation S240.

In operation S210, a multimedia file and an operation information contained in each editing track of a plurality of editing tracks are acquired. The operation information is acquired to edit the multimedia file.

In operation S220, a multimedia file frame contained in the each editing track at a current time is detected in a case of editing the multimedia file in a chronological order.

In operation S230, the multimedia file frame contained in the each editing track at the current time is edited by using the operation information associated with the multimedia file frame, so as to obtain an edited file frame contained in the each editing track at the current time.

In operation S240, an encoding synthesis is performed on the edited file frame contained in the each editing track at the current time.

According to the embodiments of the present disclosure, the encoding synthesis is performed on the multimedia file frames contained in different editing tracks at the current time, so that a granularity of the encoding synthesis may be reduced to a granularity of frame, which facilitates a control of the encoding synthesis. The present disclosure at least partially alleviates the problem that an edition failure is prone to occur when the multimedia file is made by using the related art, an editing process may not be effectively controlled, and a processing efficiency is low. By editing the multimedia file frames contained in different editing tracks frame by frame, the efficiency of processing the multimedia file may be improved, and an encoding error rate may be reduced.

According to the embodiments of the present disclosure, the editing track is used for editing the multimedia file. The user may place the multimedia file in the corresponding editing track on a client interactive interface. A type of the editing track is not limited, and the plurality of editing tracks mentioned above may be of the same or different types. The plurality of editing tracks include at least one of a video track, an audio track, a subtitle track, and a mapping track.

The types of the editing tracks described above are only exemplary embodiments, but the present disclosure is not limited thereto. The editing track may also be of a type known in the art, as long as it may be used for editing the multimedia file.

According to the embodiments of the present disclosure, various types of multimedia files may be processed. Compared with processing only one type of multimedia file, the function of editing the multimedia file is expanded.

According to the embodiments of the present disclosure, the operation information contains at least one of filter information, transition information, multiple speed information, clipping information, rotation information, image brightness information, image chroma information, image saturation information, an image display size, an image display duration, and image display coordinates. Thus, the method provided by the embodiments of the present disclosure is a rendering method, and is not limited to operations such as filtering and editing the multimedia file.

The types of the operation information described above are only exemplary embodiments, but the present disclosure is not limited thereto. The operation information may also contain other operation information known in the art, as long as it may be used for editing the multimedia file.

According to the embodiments of the present disclosure, the operation information contained in each editing track is acquired to edit the multimedia file. The types of the multimedia file include, but are not limited to a video file, an audio file, a subtitle file, and a mapping file.

According to the embodiments of the present disclosure, the detecting a multimedia file frame contained in the each editing track at a current time in a case of editing the multimedia file in a chronological order includes detecting whether a multimedia file frame to be edited is contained in the each editing track of the plurality of editing tracks at the current time or not, in the case of editing the multimedia file in the chronological order. For example, the multimedia file may be traversed to detect whether the multimedia file frame to be edited is contained in the each editing track at each time.

The multimedia file frame to be edited contained in the each editing track at the current time is obtained based on a result of detection. According to the embodiments of the present disclosure, the result of detection includes that the multimedia file frame to be edited is contained in the editing track at the current time and that the multimedia file frame to be edited is not contained in the editing track at the current time.

According to the embodiments of the present disclosure, the multimedia files contained in various editing tracks may be edited in the chronological order, and the multimedia file frames to be edited at the current time may be edited in parallel by using various processes. In this way, an edition granularity in the editing process may be controlled to a unit of frame, and the editing effect may be improved. Because the edition granularity in the editing process is controlled to the unit frame, a faulty frame may be accurately positioned as soon as possible in a case of an edition failure, so that an impact of the faulty frame on other unedited frames may be reduced.

According to the embodiments of the present disclosure, the editing the multimedia file frame contained in the each editing track at the current time by using the operation information associated with the multimedia file frame includes: editing the multimedia file frames contained in the each editing track at the current time in parallel by using the operation information associated with the multimedia file frame.

According to the embodiments of the present disclosure, the multimedia file frame includes, but is not limited to a video frame, an audio frame, a subtitle frame, and a mapping frame. According to the embodiments of the present disclosure, each video frame or each mapping frame represents a frame of image. Each subtitle frame represents a subtitle that needs to be drawn on a frame of image. The audio frame is of a concept of sampling rate, and an audio frame is an audio material with a duration of about 22.32 ms at a sampling rate of 44100 hz.

According to the embodiments of the present disclosure, the editing the multimedia file frame contained in the each editing track at the current time by using the operation information associated with the multimedia file frame includes rendering the multimedia file frame by using the operation information associated with the multimedia file frame.

When rendering each multimedia file frame, relevant operation at the current time may be detected firstly. The relevant operation may include, for example, a media picture operation such as filter special effects, zoom, rotation, etc., an editing operation, and other relevant operations. Then, an image processing is performed for each frame of image. After each multimedia file frame is processed, the encoding and compression operations are performed in a playback time order, and a final multimedia file is produced.

Figure 3:
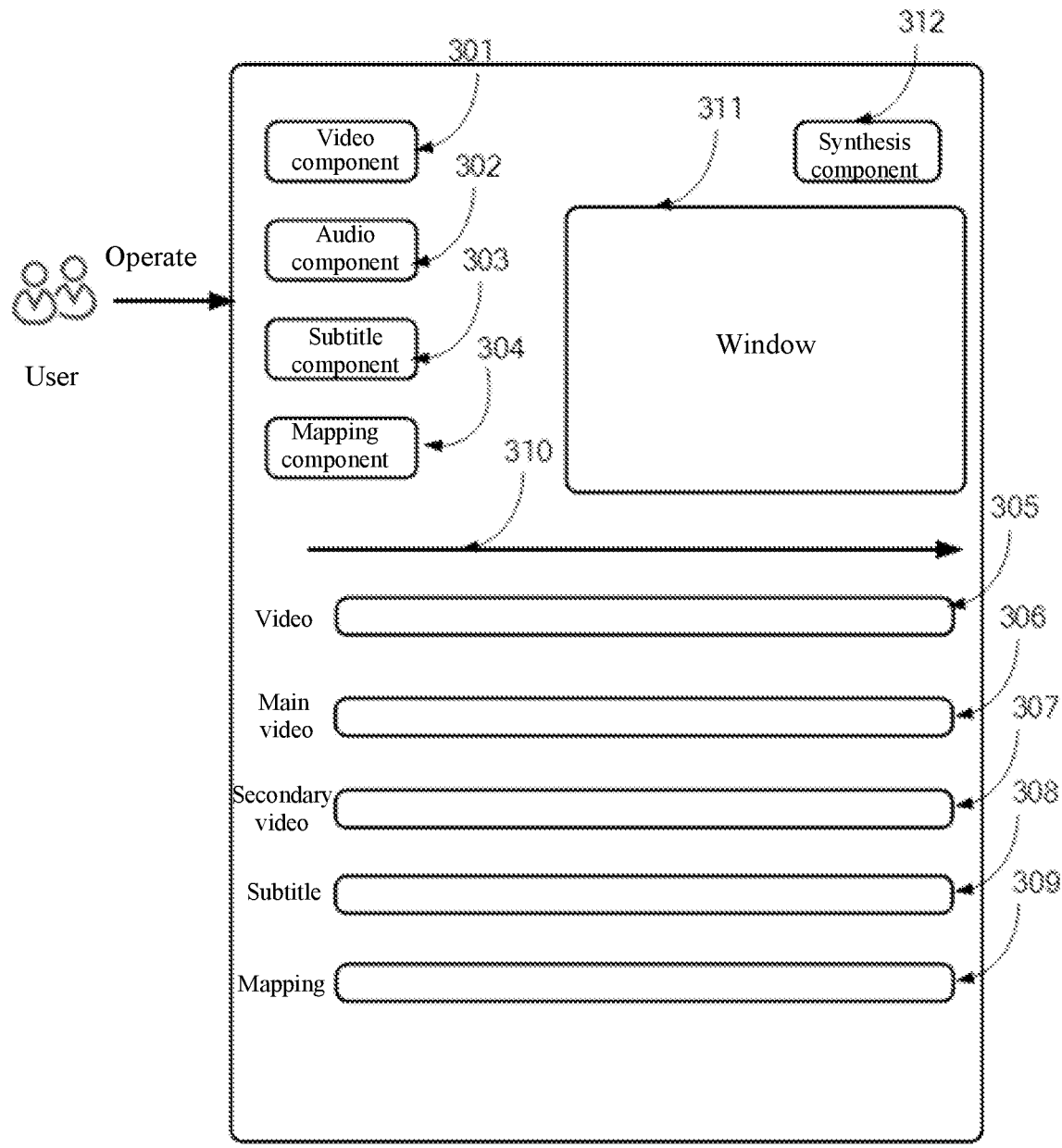
FIG. 3 shows a schematic diagram of a multimedia file editing interface displayed on a client according to some embodiments of the present disclosure.

FIG. 3 shows a schematic diagram of a multimedia file editing interface displayed on a client according to some embodiments of the present disclosure.

As shown in FIG. 3, a plurality of components for providing the multimedia file, such as a video component 301, an audio component 302, a subtitle component 303, and a mapping component 304, may be contained in the editing interface. With these components, the user may select different multimedia files, including but not limited to a video file, an audio file, a subtitle file, a mapping file, etc.

Further, according to the embodiments of the present disclosure, different types of editing tracks, such as a video track, an audio track, a subtitle track and a mapping track, may be contained in the editing interface. Each type of editing track may include one or more editing tracks. The plurality of editing tracks may include a main track and a plurality of secondary tracks. For example, as shown in FIG. 3, in an embodiment, the editing tracks may include a video track 305, a main audio track 306, a secondary audio track 307, a subtitle track 308 and a mapping track 309. The user may edit, on each editing track, one or more multimedia files corresponding to the track type. For example, the video file may be edited on the video track, the audio file may be edited on the audio track, the subtitle file may be edited on the subtitle track, and the mapping file may be edited on the mapping track.

According to the embodiments of the present disclosure, a time axis 310 may be provided for the editing track. The time axis 310 may be used as time information for reference when the multimedia files contained in different editing tracks are edited.

According to the embodiments of the present disclosure, a window 311 for previewing a synthesized target file and a synthesis component 312 may be provided in the editing interface. The synthesis component 312 may be operated to synthesize the edited multimedia files.

According to the embodiments of the present disclosure, the editing interface described above is only an exemplary embodiment and cannot improperly limit the present disclosure.

According to the embodiments of the present disclosure, in operation S210, the operation information obtained by editing the plurality of multimedia files in the plurality of editing tracks based on the time axis may be acquired. Each editing track corresponds to one or more multimedia files, and each multimedia file has respective operation information.

According to the embodiments of the present disclosure, for example, a first video file and a second video file may be contained in the video track 305. The first video file corresponds to operation information such as double speed information, cropping information, rotation information, an image display size, an image display duration, image display coordinates, etc. The second video file corresponds to operation information such as filter information, double speed information, an image display size, an image display duration, image display coordinates, etc.

Figure 4:
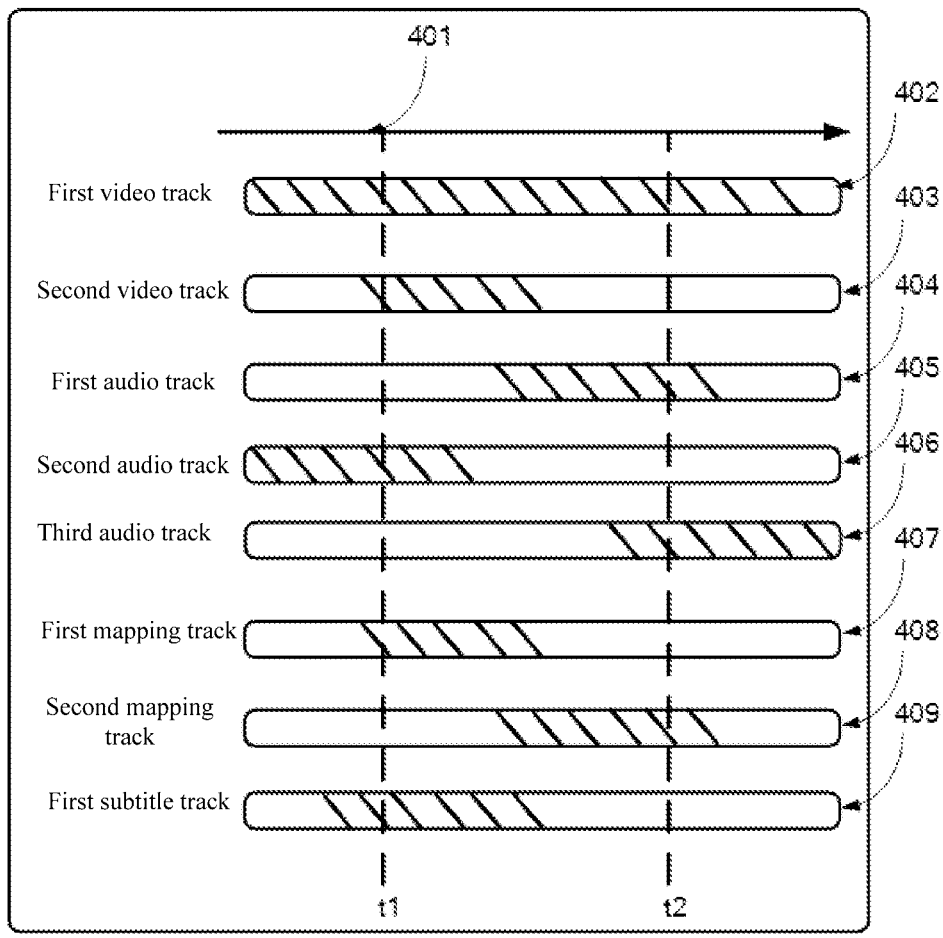
FIG. 4 shows a schematic diagram of detecting a multimedia file frame contained in each editing track at a current time according to some embodiments of the present disclosure.

FIG. 4 shows a schematic diagram of detecting a multimedia file frame contained in each editing track at a current time according to some embodiments of the present disclosure.

As shown in FIG. 4, in an embodiment, the multimedia file is edited according to the chronological order represented by the time axis 401. The editing tracks include but are not limited to a first video track 402, a second video track 403, a first audio track 404, a second audio track 405, a third audio track 406, a first mapping track 407, a second mapping track 408, and a first subtitle track 409. According to the embodiments of the present disclosure, the number of different types of editing tracks is not limited.

According to the embodiments of the present disclosure, each video track, each audio track, each mapping track and each subtitle track are traversed from a playback start time of the multimedia file. It is detected whether a video is contained in the each video track at the current time, whether an audio is contained in the each audio track at the current time, whether a map is contained in the each mapping track at the current time, and whether a subtitle is contained in the each subtitle track at the current time. If it is detected that the multimedia files are contained in the corresponding tracks, the multimedia files contained in the tracks are processed separately.

According to the embodiments of the present disclosure, for example, it is detected that video frames are contained in the first video track 402 and the second video track 403 at a current time t1, no audio frames are contained in the first audio track 404 and the third audio track 406, audio frames are contained in the second audio track 405, maps are contained in the first mapping track 407, no maps are contained in the second mapping track 408, and subtitles are contained in the first subtitle track 409. The multimedia files contained in different tracks may be processed separately. For example, the multimedia files in different tracks may be processed in parallel.

According to the embodiments of the present disclosure, the plurality of editing tracks include at least two first editing tracks of the same type. The type of the first editing tracks is not limited. For example, it may be a video editing track or an audio editing track, etc.

According to the embodiments of the present disclosure, a priority of each of the at least two first editing tracks may be determined. Prior to performing the encoding synthesis on the edited file frame contained in the each editing track at the current time, a superimposing synthesis is performed on the edited file frame contained in the each first editing track at the current time according to the priority of the each first editing track.

According to the embodiments of the present disclosure, by performing the superimposing synthesis on the edited file frame according to the priority of the each first editing track, the problem of an editing disorder during the encoding synthesis may be avoided. According to the embodiments of the present disclosure, the priority of each editing track may be determined according to a layer where the multimedia file contained in the editing track is located.

For example, if the first editing track is a video editing track, a video frame may be processed according to special effects and other operations contained in each track, and then the superimposing synthesis may be performed sequentially on the plurality of edited video frames according to the priority of the video editing track. For example, the superimposing synthesis may be performed sequentially on the plurality of edited video frames according to the priority of the video editing track from high to low. Finally, a function avcodec_send_frame is used to transmit each non-compressed video frame data that has been processed (the video frame processed in FFmpeg has an AVFrame structure) to an encoder for encoding. The encoding may be completed when the video contained in the main video track has been traversed.

According to the embodiments of the present disclosure, for example, if the at least two first editing tracks are audio tracks, then the edited file frames include an edited audio frame. The performing a superimposing synthesis on the edited file frame contained in the each first editing track at the current time includes: performing a superposing calculation on a waveform of the edited audio frame contained in the each first editing track at the current time, so as to form an audio waveform.

According to the embodiments of the present disclosure, during audio mixing, the superposing calculation may be performed on the waveforms of a plurality of audio sources, so as to form an audio waveform.

Finally, the function avcodec_send_frame is used to transmit each non-compressed audio frame data that has been processed (the audio frame processed in FFmpeg has an AVFrame structure) to the encoder for encoding. The encoding may be completed when the audio contained in the main audio track has been traversed.

According to the embodiments of the present disclosure, for an edited subtitle frame, text (subtitle) may be drawn on the corresponding video image. For an edited mapping frame, reference may be made to the above description of the edited video frame, which will not be repeated here.

According to the embodiments of the present disclosure, the performing the encoding synthesis on the edited file frame contained in the each editing track at the current time includes: encoding the edited file frame contained in the each editing track at the current time by using an encoder.

According to the embodiments of the present disclosure, for example, it is detected that at a current time t2, video frames are contained in the first video track 402, no video frames are contained in the second video track 403, audio frames are contained in the first audio track 404 and the third audio track 406, no audio frames are contained in the second audio track 405, no maps are contained in the first mapping track 407, maps are contained in the second mapping track 408, and no subtitles are contained in the first subtitle track 409. The multimedia files contained in different tracks may be processed separately.

According to the embodiments of the present disclosure, subsequent to the operation S240, that is, subsequent to performing the encoding synthesis on the edited file frame contained in the each editing track at the current time, an encoding synthesis progress may be generated.

According to the embodiments of the present disclosure, by performing the encoding synthesis on the edited file frame contained in the each editing track at the current time and generating the encoding synthesis progress, from the perspective of development, the problem that the too long transcoding instruction has a low error tolerance and contains a too large text and the transcoding instruction cannot be thoroughly understood may be avoided. From the perspective of maintenance, it may be avoided that if an error is contained in a single bulky transcoding instruction, the existing error prompts of FFmpeg cannot accurately indicate coordinates of the error, and the transcoding instruction needs to be split to alleviate the positioning problem.

According to the embodiments of the present disclosure, in the process of editing the multimedia file in the chronological order, an edition failure is positioned according to the encoding synthesis progress in response to a presence of the edition failure.

According to the embodiments of the present disclosure, the positioning an edition failure according to the encoding synthesis progress includes: determining a multimedia file frame containing the edition failure according to the encoding synthesis progress.

According to the embodiments of the present disclosure, the encoding synthesis is performed on the multimedia file in a frame-by-frame form, so that the frame containing the encoding failure may be known if the encoding failure occurs in the encoding process, so as to accurately position the encoding failure at the granularity of frame.

Figure 5:
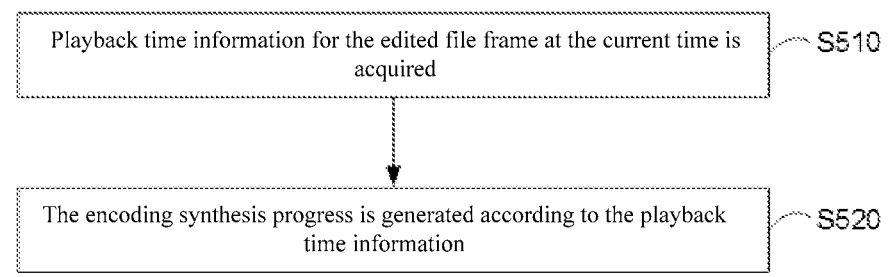
FIG. 5 schematically shows a flowchart of generating an encoding synthesis progress according to some embodiments of the present disclosure.

FIG. 5 schematically shows a flowchart of generating an encoding synthesis progress according to some embodiments of the present disclosure.

As shown in FIG. 5, the generating the encoding synthesis progress includes operation S510 to operation S520.

In operation S510, playback time information for the edited file frame at the current time is acquired.

In operation S520, the encoding synthesis progress is generated according to the playback time information.

According to the embodiments of the present disclosure, the playback time information of the edited file frame may be a playback time of the edited file frame in the synthesized multimedia file. For example, the synthesized multimedia file is a video with duration of 1 hour, and the playback time of the edited file frame corresponding to the current time in the synthesized multimedia file is the 15$^{th}$ minute, then the playback time information for the edited file frame is the 15$^{th}$ minute. The encoding synthesis progress may be generated according to the playback time information.

According to the embodiments of the present disclosure, the method of editing the multimedia file provided in the embodiments of the present disclosure may include: acquiring transcoding synthesis configuration information, such as code rate, resolution, frame rate, etc.; acquiring information such as an overall duration of the current synthesized object; traversing according to the time dimension so as to detect whether there is frame information at each time and performing a rendering encoding; reporting a current progress; and outputting a target file after the encoding synthesis is performed.

According to the embodiments of the present disclosure, a pure String method without a data structure is abandoned, and the multimedia data is abstractly managed by a frame-by-frame processing method, so that it is easier to iterate encoding and the efficiency of development and maintenance is higher.

Figure 6:
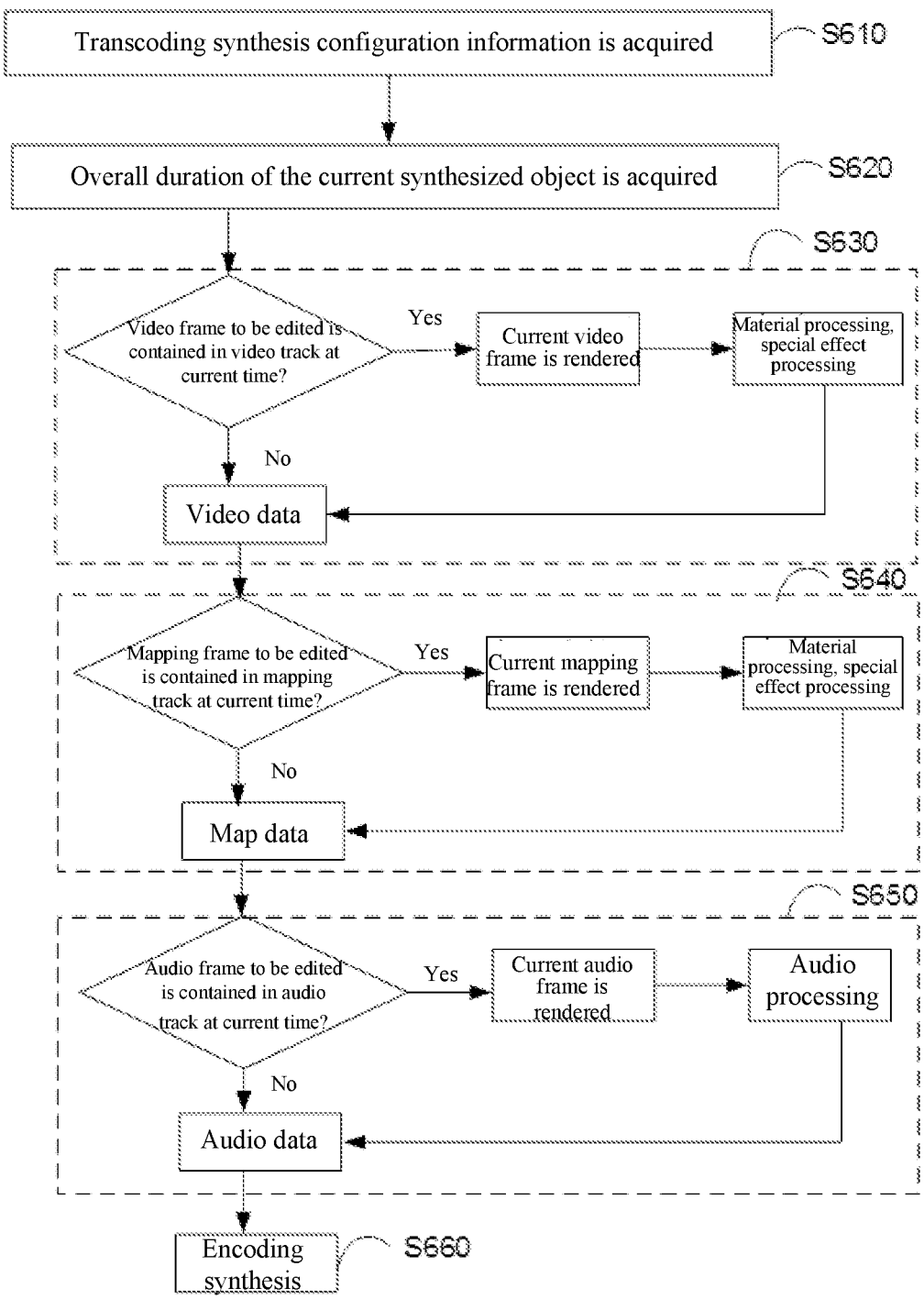
FIG. 6 schematically shows a flowchart of a method of editing a multimedia file according to other embodiments of the present disclosure.

FIG. 6 schematically shows a flowchart of a method of editing a multimedia file according to other embodiments of the present disclosure.

As shown in FIG. 6, a method 600 includes operation S610 to operation S660.

In operation S610, the transcoding synthesis configuration information is acquired.

In operation S620, the information such as the overall duration of the current synthesized object is acquired.

In operation S630, it is detected whether a video frame to be edited is contained in the video track at the current moment. If so, the current video frame is rendered, and a material processing, a special effect processing, etc., are performed to obtain the video data. If not, the original video data is directly output without editing, or no video data is output if there is no video data at the current moment.

In operation S640, it is detected whether a mapping frame to be edited is contained in the mapping track at the current moment. If so, the current mapping frame is rendered, and a material processing, a special effect processing, etc., are performed to obtain the mapping data. If not, the original mapping data is directly output without editing, or no mapping data is output if there is no mapping data at the current moment.

In operation S650, it is detected whether an audio frame to be edited is contained in the audio track at the current moment. If so, the current audio frame is rendered, and an audio processing is performed to obtain the audio data. If not, the original audio data is directly output without editing, or no audio data is output if there is no audio data at the current moment.

In operation S660, the encoding synthesis is performed on the video data, the mapping data and the audio data.

According to the embodiments of the present disclosure, subsequent to the operation S660, the encoding synthesis progress may further be output and displayed. Alternatively, the editing progress may be output and displayed subsequent to the operations S630 to S650, According to the embodiments of the present disclosure, the operations S630 to S650 may be executed in parallel or in series. A parallel execution of the operations S630 to S650 may improve the editing efficiency and reduce editing time.

According to the embodiments of the present disclosure, the encoding synthesis is performed on the multimedia file frames contained in different editing tracks at the current time, so that a granularity of the encoding synthesis may be reduced to a granularity of frame, which facilitates a control of the encoding synthesis. The present disclosure at least partially alleviates the problem that an edition failure is prone to occur when the multimedia file is made by using the related art, an editing process may not be effectively controlled, and a processing efficiency is low. By editing the multimedia files contained in different editing tracks frame by frame, the efficiency of processing the multimedia file is improved, and the encoding error rate is reduced.

Figure 7:
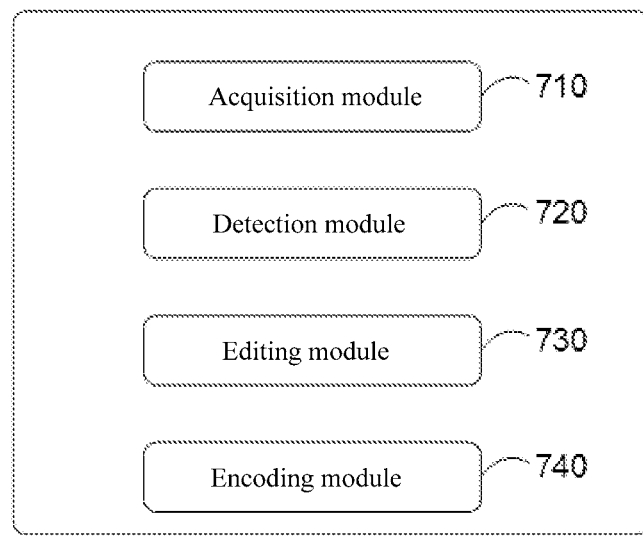
FIG. 7 schematically shows a block diagram of an apparatus of editing a multimedia file according to some embodiments of the present disclosure.

FIG. 7 schematically shows a block diagram of an apparatus of editing a multimedia file according to some embodiments of the present disclosure.

As shown in FIG. 7, an apparatus 700 of editing a multimedia file includes an acquisition module 710, a detection module 720, an editing module 730 and an encoding module 740.

The acquisition module 710 is used to acquire a multimedia file and an operation information contained in each editing track of a plurality of editing tracks. The operation information is acquired to edit the multimedia file.

The detection module 720 is used to detect a multimedia file frame contained in the each editing track at a current time in a case of editing the multimedia file in a chronological order.

The editing module 730 is used to edit the multimedia file frame contained in the each editing track at the current time by using the operation information associated with the multimedia file frame, so as to obtain an edited file frame contained in the each editing track at the current time.

The encoding module 740 is used to perform an encoding synthesis on the edited file frame contained in the each editing track at the current time.

According to the embodiments of the present disclosure, the encoding synthesis is performed on the multimedia file frames contained in different editing tracks at the current time, so that the granularity of the encoding synthesis may be reduced to the granularity of frame, which facilitates the control of the encoding synthesis. The present disclosure at least partially alleviates the problem that an edition failure is prone to occur when the multimedia file is made by using the related art, an editing process may not be effectively controlled, and a processing efficiency is low. By editing the multimedia files contained in different editing tracks frame by frame, the efficiency of processing the multimedia file is improved, and the encoding error rate is reduced.

According to the embodiments of the present disclosure, the detection module 740 includes a detection unit and an acquisition unit.

The detection unit is used to detect whether a multimedia file frame to be edited is contained in the each editing track of the plurality of editing tracks at the current time or not, in the case of editing the multimedia file in the chronological order.

The acquisition unit is used to acquire the multimedia file frame to be edited contained in the each editing track at the current time, based on a result of detection.

According to the embodiments of the present disclosure, the plurality of editing tracks include at least two first editing tracks of the same track type. The apparatus 700 further includes a determination module and a synthesis module.

The determination module is used to determine a priority of each first editing track of the at least two first editing tracks.

The synthesis module is used to perform a superimposing synthesis on the edited file frame contained in the each first editing track at the current time according to the priority of the each first editing track, prior to performing the encoding synthesis on the edited file frame contained in the each editing track at the current time.

According to the embodiments of the present disclosure, the at least two first editing tracks are audio tracks, then the edited file frame includes an edited audio frame. The synthesis module is used to perform a superposing calculation on a waveform of the edited audio frame contained in the each first editing track at the current time, so as to form an audio waveform.

According to the embodiments of the present disclosure, the encoding module is used to encode the edited file frame contained in the each editing track at the current time by using an encoder.

According to the embodiments of the present disclosure, the apparatus 700 further includes a generation module used to generate an encoding synthesis progress subsequent to performing the encoding synthesis on the edited file frame contained in the each editing track at the current time.

According to the embodiments of the present disclosure, the apparatus 700 further includes a positioning module used to position an edition failure according to the encoding synthesis progress in response to a presence of the edition failure, in the process of editing the multimedia file in the chronological order.

According to the embodiments of the present disclosure, the positioning module is used to determine a multimedia file frame containing the edition failure according to the encoding synthesis progress.

According to the embodiments of the present disclosure, the generation module includes an acquisition unit and a generation unit.

The acquisition unit is used to acquire playback time information for the edited file frame at the current time.

The generation unit is used to generate the encoding synthesis progress according to the playback time information.

According to the embodiments of the present disclosure, the editing module is used to edit the multimedia file frame contained in the each editing track at the current time in parallel by using the operation information associated with the multimedia file frame.

According to the embodiments of the present disclosure, the types of the plurality of editing tracks include at least one of a video track, an audio track, a subtitle track, and a mapping track.

According to the embodiments of the present disclosure, the operation information contains at least one of filter information, transition information, multiple speed information, clipping information, rotation information, image brightness information, image chroma information, image saturation information, an image display size, an image display duration, and image display coordinates.

According to the embodiments of the present disclosure, the present disclosure further provides an electronic device and a computer-readable storage medium.

Figure 8:
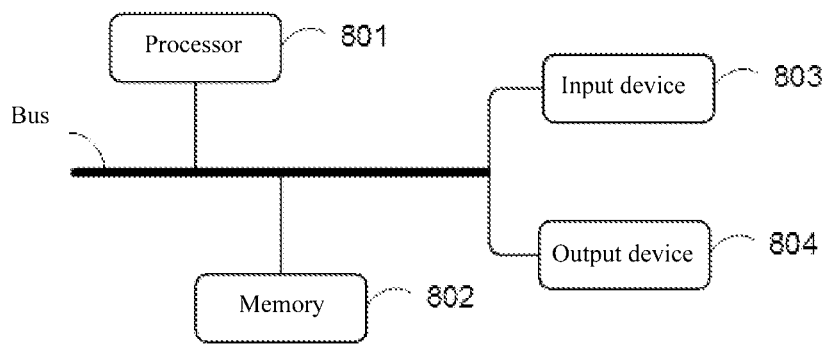
FIG. 8 schematically shows a block diagram of a computer system suitable for implementing the method of editing the multimedia file according to some embodiments of the present disclosure.

FIG. 8 shows a block diagram of an electronic device for implementing the method of editing the multimedia file according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, an electronic device 800 may include one or more processors 801, a memory 802, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device providing a part of necessary operations (for example, as a server array, a group of blade servers, or a multi-processor system). In FIG. 8, a processor 801 is illustrated by way of example.

The memory 802 is a non-transitory computer-readable storage medium provided by the present disclosure. The memory stores instructions executable by at least one processor, to cause the at least one processor to perform the method of editing the multimedia file provided in the present disclosure. The non-transitory computer-readable storage medium of the present disclosure stores computer instructions for allowing a computer to execute the method of editing the multimedia file provided in the present disclosure.

The memory 802, as a non-transitory computer-readable storage medium, may be used to store non-transitory software programs, non-transitory computer-executable programs and modules, such as program instructions/modules corresponding to the method of editing the multimedia file in the embodiments of the present disclosure (for example, the acquisition module 710, the detection module 720, the editing module 730 and the encoding module 740 shown in FIG. 7). The processor 801 executes various functional applications and data processing of the server by executing the non-transient software programs, instructions and modules stored in the memory 802, thereby implementing the method of editing the multimedia file in the embodiments of the method mentioned above.

The memory 802 may include a program storage area and a data storage area. The program storage area may store an operating system and an application program required by at least one function. The data storage area may store data etc. generated by using the electronic device 800 according to the method of editing the multimedia file. In addition, the memory 802 may include a high-speed random access memory, and may further include a non-transitory memory, such as at least one magnetic disk storage device, a flash memory device, or other non-transitory solid-state storage devices. In some embodiments, the memory 802 may optionally include a memory provided remotely with respect to the processor 801, and such remote memory may be connected through a network to the electronic device for implementing the method of editing the multimedia file. Examples of the above-mentioned network include, but are not limited to the Internet, intranet, local area network, mobile communication network, and combination thereof.

The electronic device for implementing the method of editing the multimedia file may further include an input device 803 and an output device 804. The processor 801, the memory 802, the input device 803 and the output device 804 may be connected by a bus or in other manners. In FIG. 8, the connection by a bus is illustrated by way of example.

The input device 803 may receive input information of numbers or character, and generate key input signals related to user settings and function control of the electronic device 800 for implementing the method of editing the multimedia file, such as a touch screen, a keypad, a mouse, a track pad, a touchpad, a pointing stick, one or more mouse buttons, a trackball, a joystick, and so on. The output device 804 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

According to the embodiments of the present disclosure, the encoding synthesis is performed on the multimedia file frames contained in different editing tracks at the current time, so that a granularity of the encoding synthesis may be reduced to a granularity of frame, which facilitates a control of the encoding synthesis. The present disclosure at least partially alleviate the problem that an edition failure is prone to occur when the multimedia file is made by using the related art, an editing process may not be effectively controlled, and a processing efficiency is low. By editing the multimedia file frames contained in different editing tracks frame by frame, the efficiency of processing the multimedia file is improved, and an encoding error rate is reduced.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the protection scope of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of editing a multimedia file, comprising:
   acquiring a multimedia file and an operation information contained in each editing track of a plurality of editing tracks, wherein the operation information is acquired to edit the multimedia file;
   detecting a multimedia file frame contained in the each editing track at a current time in a case of editing the multimedia file in a chronological order;
   editing the multimedia file frame contained in the each editing track at the current time by using the operation information associated with the multimedia file frame, so as to obtain an edited file frame contained in the each editing track at the current time; and
   performing an encoding synthesis on the edited file frame contained in the each editing track at the current time.

2. The method of claim 1, wherein the detecting a multimedia file frame contained in the each editing track at a current time in a case of editing the multimedia file in a chronological order comprises:
   detecting whether a multimedia file frame to be edited is contained in the each editing track of the plurality of editing tracks at the current time or not, in the case of editing the multimedia file in the chronological order; and
   obtaining the multimedia file frame to be edited contained in the each editing track at the current time, based on a result of detection.

3. The method of claim 1, wherein the plurality of editing tracks comprise at least two first editing tracks of the same track type, and the method further comprises:
   determining a priority of each first editing track of the at least two first editing tracks; and
   performing a superimposing synthesis on the edited file frame contained in the each first editing track at the current time according to the priority of the each first editing track, prior to the performing the encoding synthesis on the edited file frame contained in the each editing track at the current time.

4. The method of claim 3, wherein the at least two first editing tracks are audio tracks, the edited file frame contains an edited audio frame, and the performing a superimposing synthesis on the edited file frame contained in the each first editing track at the current time comprises:
   performing a superposing calculation on a waveform of the edited audio frame contained in the each first editing track at the current time, so as to form an audio waveform.

5. The method of claim 1, wherein the performing an encoding synthesis on the edited file frame contained in the each editing track at the current time comprises:
   encoding the edited file frame contained in the each editing track at the current time by using an encoder.

6. The method of claim 1, further comprising:
generating an encoding synthesis progress subsequent to the performing the encoding synthesis on the edited file frame contained in the each editing track at the current time.

7. The method of claim 6, further comprising:
positioning an edition failure according to the encoding synthesis progress in response to a presence of the edition failure, during the editing the multimedia file in the chronological order.

8. The method of claim 7, wherein the positioning an edition failure according to the encoding synthesis progress comprises:
determining a multimedia file frame containing the edition failure according to the encoding synthesis progress.

9. The method of claim 6, wherein the generating an encoding synthesis progress comprises:
acquiring a playback time information for the edited file frame at the current time; and
generating the encoding synthesis progress according to the playback time information.

10. The method of claim 1, wherein the editing the multimedia file frame contained in the each editing track at the current time by using the operation information associated with the multimedia file frame comprises:
editing the multimedia file frame contained in the each editing track at the current time in parallel by using the operation information associated with the multimedia file frame.

11. The method of claim 1, wherein the plurality of editing tracks comprise at least one of a video track, an audio track, a subtitle track, and a mapping track.

12. The method of claim 1, wherein the operation information contains at least one of a filter information, a transition information, a multiple speed information, a clipping information, a rotation information, an image brightness information, an image chroma information, an image saturation information, an image display size, an image display duration, and image display coordinates.

13. An electronic device, comprising:
at least one processor; and
a memory communicatively connected to the at least one processor, wherein the memory stores instructions executable by the at least one processor, and the instructions, when executed by the at least one processor, cause the at least one processor to implement operations of editing a multimedia file, comprising:
acquiring a multimedia file and an operation information contained in each editing track of a plurality of editing tracks, wherein the operation information is acquired to edit the multimedia file;
detecting a multimedia file frame contained in the each editing track at a current time in a case of editing the multimedia file in a chronological order;
editing the multimedia file frame contained in the each editing track at the current time by using the operation information associated with the multimedia file frame, so as to obtain an edited file frame contained in the each editing track at the current time; and
performing an encoding synthesis on the edited file frame contained in the each editing track at the current time.

14. A non-transitory computer-readable storage medium having computer instructions stored thereon, wherein the computer instructions allow a computer to implement operations of editing a multimedia file, comprising:
acquiring a multimedia file and an operation information contained in each editing track of a plurality of editing tracks, wherein the operation information is acquired to edit the multimedia file;
detecting a multimedia file frame contained in the each editing track at a current time in a case of editing the multimedia file in a chronological order;
editing the multimedia file frame contained in the each editing track at the current time by using the operation information associated with the multimedia file frame, so as to obtain an edited file frame contained in the each editing track at the current time; and
performing an encoding synthesis on the edited file frame contained in the each editing track at the current time.

* * * * *